United States Patent [19]

Huang

[11] Patent Number: 5,429,406
[45] Date of Patent: Jul. 4, 1995

[54] SUN SHIELD FOR MOTOR VEHICLES

[76] Inventor: Ping-Jung Huang, P.O. Box 82-144, Taipei, Taiwan

[21] Appl. No.: 300,746

[22] Filed: Sep. 6, 1994

[51] Int. Cl.$^6$ .............................................. B60J 11/00
[52] U.S. Cl. ................... 296/95.1; 296/136; 150/166
[58] Field of Search ............... 296/95.1, 136; 150/166, 150/168

[56] References Cited

U.S. PATENT DOCUMENTS

| | | | |
|---|---|---|---|
| 2,787,311 | 4/1957 | Cohen et al. | 296/95.1 X |
| 2,849,012 | 8/1958 | Cohen et al. | 296/95.1 X |
| 5,029,933 | 7/1991 | Gillem | 296/95.1 X |
| 5,230,545 | 7/1993 | Huang et al. | 296/95.1 |
| 5,378,035 | 1/1995 | Wu | 296/136 |

*Primary Examiner*—Joseph D. Pape
*Attorney, Agent, or Firm*—Alfred Lei

[57] ABSTRACT

A sun shield for motor vehicles including an upper cover having a rectangular portion, a first enlarged portion at a short side of the rectangular portion, a second enlarged portion at another short side of the rectangular portion, the first and second enlarged portions being formed at an outer side with a pocket in which is fitted a magnet, the rectangular portion having two rods at both long sides, each of the rods having a smaller diameter at an outer end, a lower cover having a rectangular central portion, a first flap at a long side of the rectangular central portion, and a second flap at another long side of the rectangular central portion, and four fixing blocks fastened on the lower cover and provided with a magnet at a bottom thereof, each of the fixing blocks having a horizontal slot receiving the outer end of each of the rods.

2 Claims, 7 Drawing Sheets

SUN SHIELD FOR MOTOR VEHICLES

BACKGROUND OF THE INVENTION

It has been found that sun screens are used on motor vehicles for multiple purposes. One such purpose is to minimize heating of an unoccupied vehicle exposed to the sun, while another purpose to slow down deterioration of paint surfaces. Hence, many attempts have been made for these purposes. However, the prior art sun screens are cumbersome covers and frames not easily stored on a vehicle or a cover that cannot be spaced apart from a vehicle to allow cooling by wind currents. In addition, the prior art frame supported covers cannot be quickly and easily mounted. FIG. 9 illustrates one of the prior art sun screens.

Therefore, it is an object of the present invention to provide a sun shield for motor vehicles which can obviate and mitigate the above-mentioned drawbacks.

SUMMARY OF THE INVENTION

This invention relates to an improved sun shield for motor vehicles.

It is the primary object of the present invention to provide a sun shield for motor vehicles which can effectively keep an automobile from the sun.

It is another object of the present invention to provide a sun shield for motor vehicles which is easy to operate.

It is still another object of the present invention to provide a sun shield for motor vehicles which is simple in construction.

It is still another object of the present invention to provide a sun shield for motor vehicles which is fit for practical use.

It is a further object of the present invention to provide a sun shield for motor vehicles which is economic to produce.

The other objects and merits and a fuller understanding of the present invention will be obtained by those having ordinary skill in the are when the following detailed description is read in conjunction with the accompanying drawings wherein like numerals refer to like or similar parts.

BRIEF DESCRIPTION OF THE PREFERRED EMBODIMENT

DETAILED DESCRIPTION OF THE PREFERRED EMBODIMENT

Figure 1:
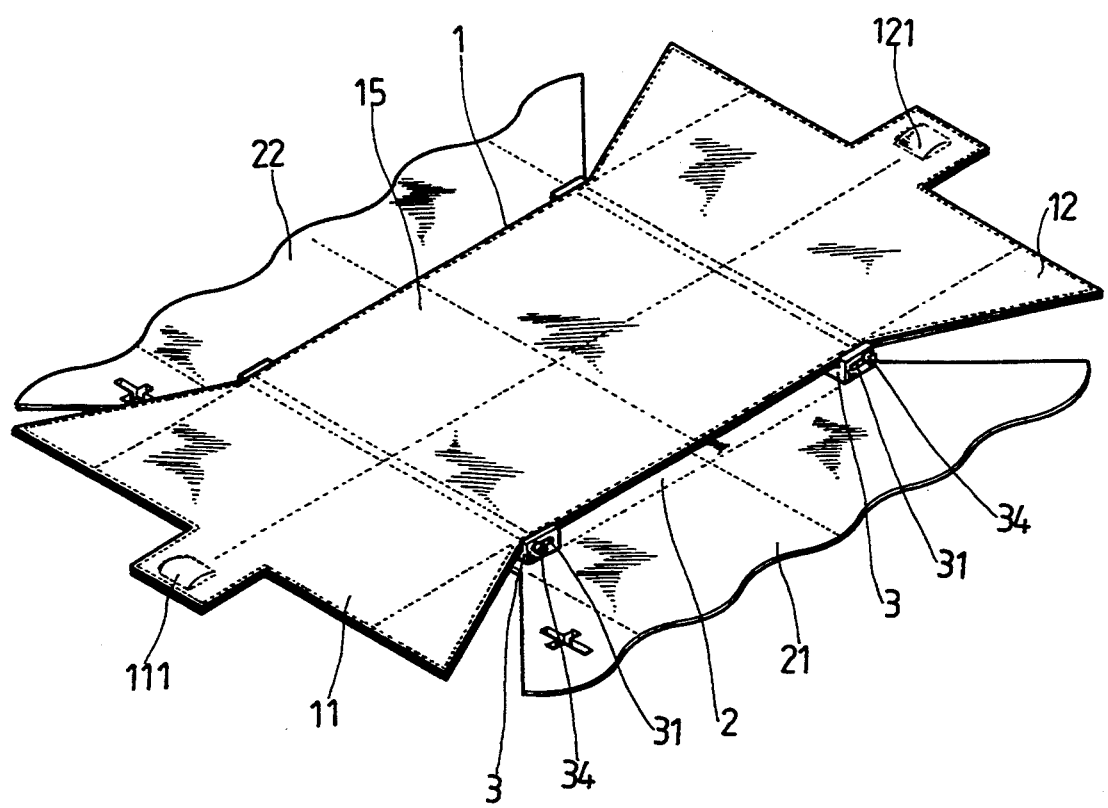
FIG. 1 is a perspective view of the present invention.

For the purpose of promoting an understanding of the principles of the invention, reference will now be made to embodiment illustrated in the drawings. Specific language will be used to describe same. It will, nevertheless, be understood that no limitation of the/-scope of the invention is thereby intended, such alternations and further modifications in the illustrated device, and such further applications of the principles of the invention as illustrated herein being contemplated as would normally occur to one skilled in the art to which the invention relates.

Figures 2, 3:
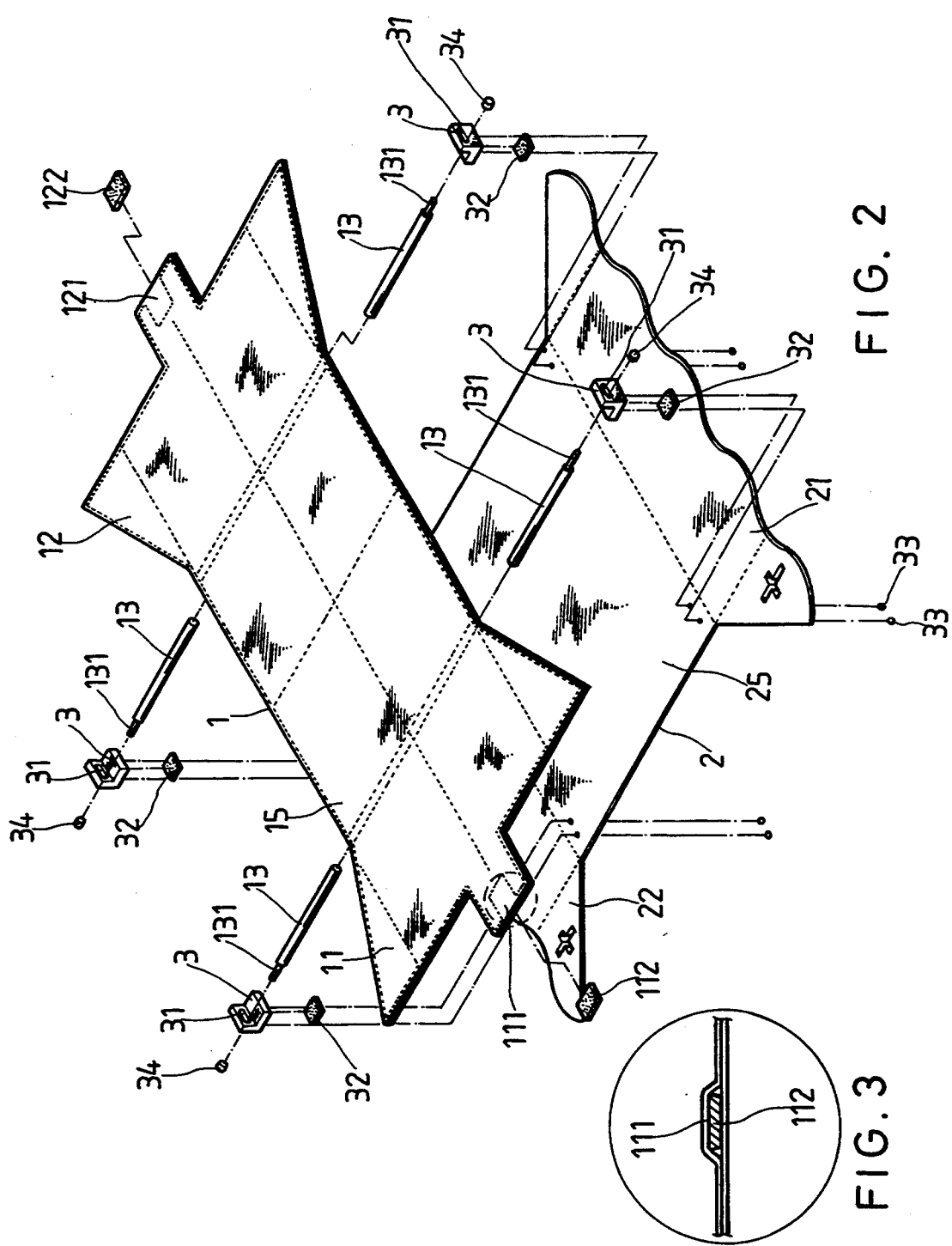
FIG. 2 is an exploded view of the present invention.
FIG. 3 is an enlarged fragmentary sectional view of the present invention.

With reference to the drawings and in particular to FIGS. 1, 2 and 3 thereof, the sun shield for motor vehicles according to the present invention mainly comprises an upper cover 1 and a lower cover 2.

The upper cover I has a rectangular portion 15, a first enlarged portion 11 at a short side of the rectangular portion 15, and a second enlarged portion 12 at another short side of the rectangular portion 15. The first enlarged portion 11 and the second enlarged portion 12 are formed with pockets 111 and 1121 in which are fitted magnets 112 and 122 respectively (see FIG. 3). Both long sides of the rectangular portion 15 of the upper cover 1 are provided with two rods 13 which have a smaller diameter at the outer end 131.

Figure 4:
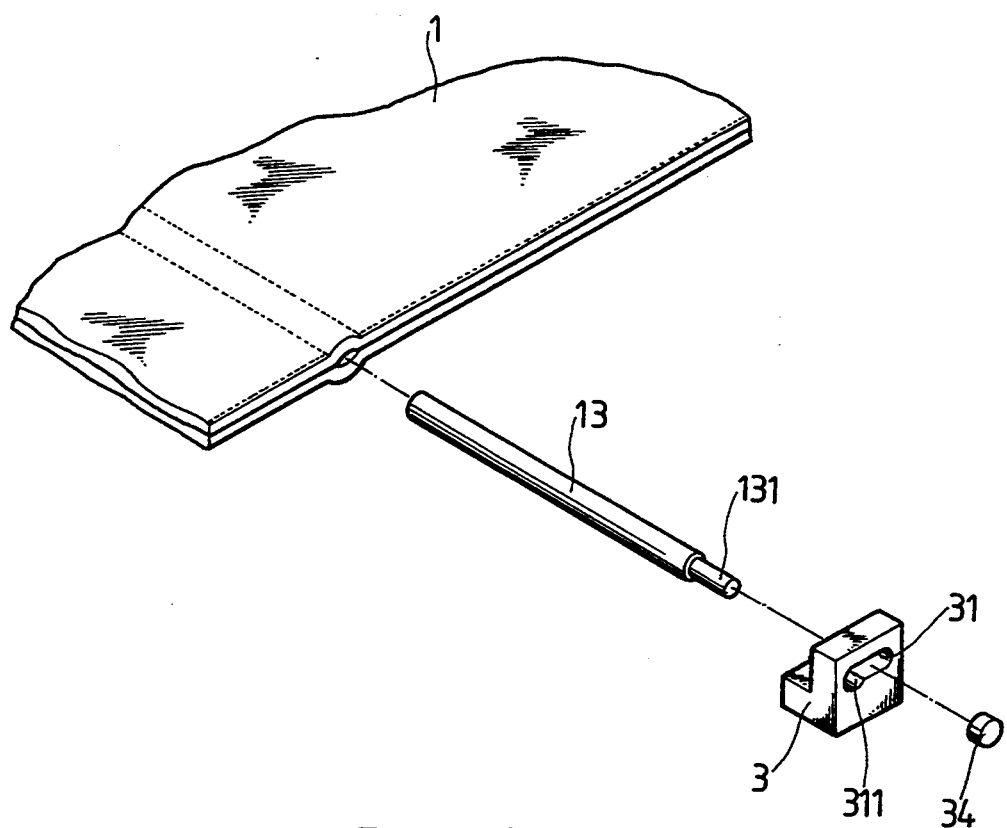
FIG. 4 is an enlarged exploded view of the present invention.

The lower cover 2 has a rectangular central portion 25, a first flap 21 at a long side of the rectangular central portion 25, a second flap 22 at another long side of the rectangular central portion 25. On the lower cover 2 are fixedly mounted four L-shaped mixing blocks 3 by rivets 33. The L-shaped fixing block 3 has a horizontal slot 31 with a recess 311 at an outer end (see FIG. 4). A magnet 32 is arranged on the bottom of the L-shaped fixing block 3.

In assembly, the upper cover 1 is disposed on the lower cover 2 with the outer end 131 of the rod 13 extending through the slot 31 of the L-shaped fixing block 3 to engage with a cap 34.

Figure 5:
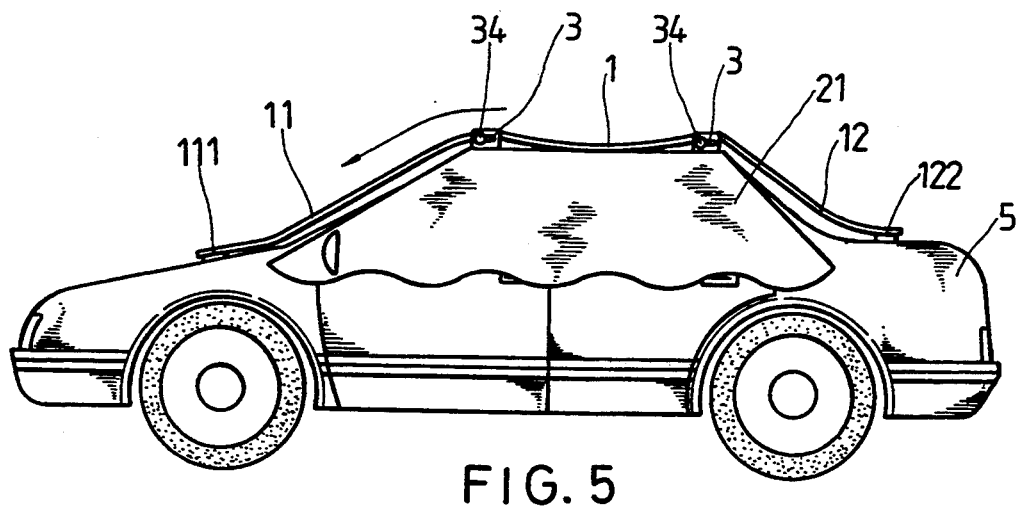
FIGS. 5, 6 and 7 show the way how the present invention works.
Figure 6:
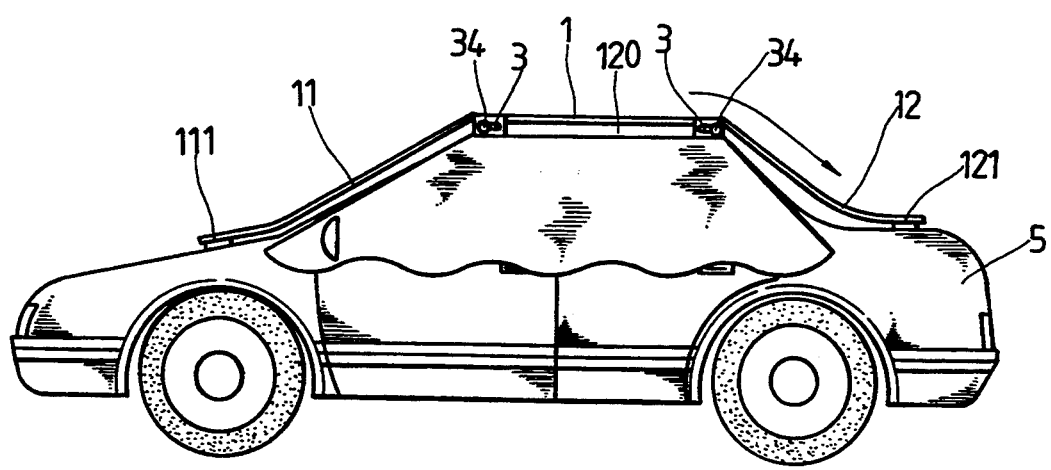
Figure 7:
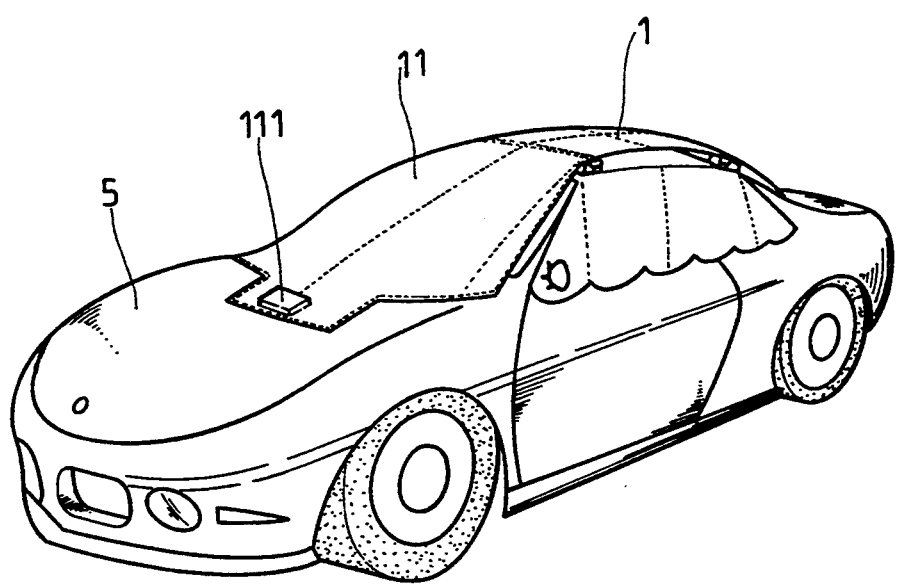

FIGS. 5, 6 and 7 show how the sun shield works. As illustrated, the lower cover 2 is kept on the top of an automobile by the magnets 32 and the upper cover 1 is kept in place by the magnets 112 and 122. As the first and second enlarged portions 11 and 12 of the upper cover extend downward to cover the windshield and the rear windshield of an automobile, the rectangular portion 15 will be pulled straight thereby causing the outer ends 131 of the rods 13 to engage with corresponding recesses 311 of the L-shaped fixing blocks 3.

Figure 8:
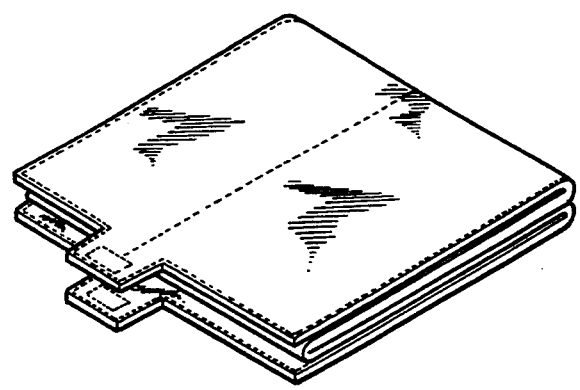
FIG. 8 is a perspective view of the present invention in collapsed condition.
Figure 9:
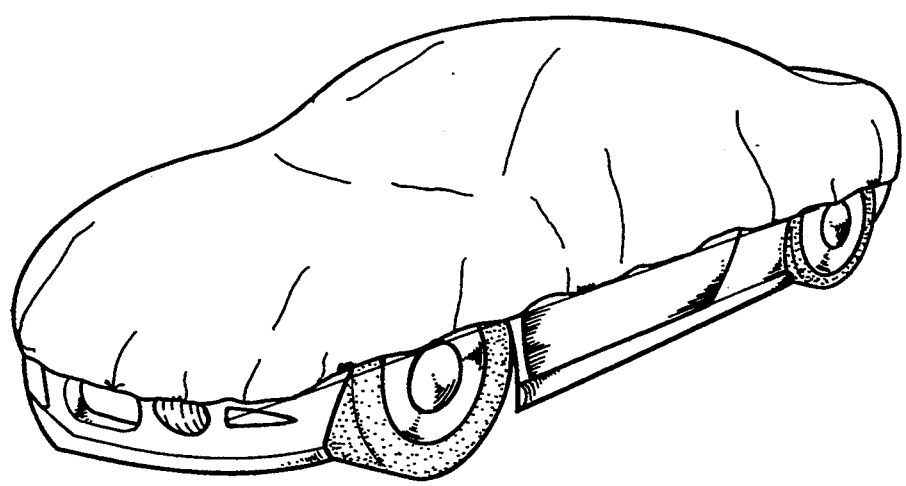
FIG. 9 is a perspective of a prior art sun screen for motor vehicles.

When not in use, the sun shield according to the present invention may be folded as shown in FIG. 8.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A sun shield for motor vehicles comprising:
   an upper cover having a rectangular portion, a first enlarged portion at a short side of the rectangular portion, a second enlarged portion at another short side of the rectangular portion, said first and second enlarged portions being formed at an outer side with a pocket in which is fitted a magnet, said rectangular portion having two rods as both long sides, each of said rods having a smaller diameter at an outer end;

a lower cover having a rectangular central portion, a first flap at a long side of the rectangular central portion, and a second flap at another long side of the rectangular central portion; and four fixing blocks fastened on said lower cover and provided with a magnet at a bottom thereof, each of said fixing blocks having a horizontal slot receiving the outer end of each of said rods.

2. The sun shield for motor vehicles as claimed in claim 1, wherein each of said fixing blocks has a horizontal slot with a recess at an outer end.

* * * * *